United States Patent
Gollanapalli et al.

(10) Patent No.: US 11,568,518 B2
(45) Date of Patent: Jan. 31, 2023

(54) METHOD AND ELECTRONIC DEVICE FOR DEBLURRING BLURRED IMAGE

(71) Applicant: SAMSUNG ELECTRONICS CO., LTD., Suwon-si (KR)

(72) Inventors: Tejpratap Venkata Subbu Lakshmi Gollanapalli, Bengaluru (IN); Kuladeep Marupalli, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 102 days.

(21) Appl. No.: 17/119,336

(22) Filed: Dec. 11, 2020

(65) Prior Publication Data

US 2021/0183020 A1 Jun. 17, 2021

(30) Foreign Application Priority Data

Dec. 11, 2019 (IN) .............................. 201941051319
Sep. 8, 2020 (IN) .............................. 201941051319

(51) Int. Cl.
*G06T 5/00* (2006.01)
*G06T 7/73* (2017.01)
(Continued)

(52) U.S. Cl.
CPC ................ *G06T 5/003* (2013.01); *G06T 5/20* (2013.01); *G06T 7/73* (2017.01); *G06T 9/002* (2013.01);
(Continued)

(58) Field of Classification Search
CPC combination set(s) only.
See application file for complete search history.

(56) References Cited

U.S. PATENT DOCUMENTS 10,755,390 B2   8/2020 Wang et al.
2015/0030239 A1*  1/2015 Fang ...................... G06T 5/003
                                                              382/255
(Continued)

FOREIGN PATENT DOCUMENTS

CN  108846820 A  11/2018
CN  105976332 B  3/2019
(Continued)

OTHER PUBLICATIONS

Lenka, Manoj Kumar, Anubha Pandey, and Anurag Mittal. "Blind deblurring using GANs." arXiv preprint arXiv:1907.11880 (2019). (Year: 2019).*

(Continued)

*Primary Examiner* — Andrae S Allison
(74) *Attorney, Agent, or Firm* — Sughrue Mion, PLLC

(57) ABSTRACT

A method for deblurring a blurred image includes encoding, by at least one processor, a blurred image at a plurality of stages of encoding to obtain an encoded image at each of the plurality of stages; decoding, by the at least one processor, an encoded image obtained from a final stage of the plurality of stages of encoding by using an encoding feedback from each of the plurality of stages and a machine learning (ML) feedback from at least one ML model; and generating, by the at least one processor, a deblurred image in which at least one portion of the blurred image is deblurred based on a result of the decoding.

18 Claims, 16 Drawing Sheets

(51) Int. Cl.
  *G06T 9/00* (2006.01)
  *G06T 5/20* (2006.01)
(52) U.S. Cl.
  CPC ............... *G06T 2207/20081* (2013.01); *G06T 2207/20084* (2013.01)

(56) References Cited

U.S. PATENT DOCUMENTS

| | | | |
|---|---|---|---|
| 2017/0316552 | A1 | 11/2017 | Hanocka et al. |
| 2018/0101957 | A1* | 4/2018 | Talathi .................... G06V 10/40 |
| 2019/0139199 | A1 | 5/2019 | Wang et al. |
| 2019/0362190 | A1* | 11/2019 | Gvsl ........................ G06V 10/28 |
| 2020/0074691 | A1* | 3/2020 | Asama ....................... G06T 5/20 |
| 2020/0349680 | A1 | 11/2020 | Tao et al. |
| 2021/0004589 | A1* | 1/2021 | Turkelson ................. G06T 5/00 |
| 2021/0166350 | A1 | 6/2021 | Wang et al. |

FOREIGN PATENT DOCUMENTS

| | | |
|---|---|---|
| CN | 109345449 B | 11/2020 |
| CN | 108510451 B | 2/2021 |
| KR | 10-2016-0132209 A | 11/2016 |
| KR | 10-2019-0114340 A | 10/2019 |
| WO | 2019/192338 A1 | 10/2019 |

OTHER PUBLICATIONS

Tao, Xin, et al. "Scale-recurrent network for deep image deblurring." Proceedings of the IEEE conference on computer vision and pattern recognition. 2018. (Year: 2018).*

Cho, Sung-Jin, et al. "Rethinking coarse-to-fine approach in single image deblurring." Proceedings of the IEEE/CVF International Conference on Computer Vision. 2021. (Year: 2021).*

Koh, Jaihyun, Jangho Lee, and Sungroh Yoon. "Single-image deblurring with neural networks: A comparative survey." Computer Vision and Image Understanding 203 (2021): 103134. (Year: 2021).*

International Written Opinion dated Mar. 24, 2021 issued by the International Searching Authority in International Application No. PCT/KR2020/018078 (PCT/ISA/237).

International Search Report dated Mar. 24, 2021 issued by the International Searching Authority in International Application No. PCT/KR2020/018078 (PCT/ISA/210).

Communication dated Nov. 29, 2021 by the Indian Patent Office for Indian Patent Application No. 201941051319.

Seungjun Nah et al., "Deep Multi-scale Convolutional Neural Network for Dynamic Scene Deblurring", Proceedings of the IEEE Conference on Computer Vision and Pattern Recognition, 2017, pp. 3883-3891, 9 pages total.

Xin Tao et al., "Scale-recurrent Network for Deep Image Deblurring", Proceedings of the IEEE Conference on Computer Vision and Pattern Recognition, 2018, pp. 8174-8182, 9 pages total.

Tae Hyun Kim et al., "Segmentation-Free Dynamic Scene Deblurring", IEEE, Computer Vision Foundation, CVPR2014, 2014, 8 pages total.

Jian Sun et al., "Learning a Convolutional Neural Network for Non-uniform Motion Blur Removal", IEEE, Computer Vision Foundation, CVPR2015, 2015, 9 pages total.

Miika Aittala et al., "Burst Image Deblurring Using Permutation Invariant Convolutional Neural Networks", ECCV 2018, 2018, 17 pages total.

K.Gayathri et al., "Aggregation Of Blurred Images Through Weighted Fba To Remove Camera Shake", International Journal on Applications in Engineering and Technology, vol. 2, Issue 5, May 2016, pp. 15-19, 5 pages total.

Xinyi Zhang et al., "A Deep Encoder-Decoder Networks for Joint Deblurring and Super-Resolution", IEEE, ICASSP 2018, 2018, pp. 1448-1452, 5 pages total.

Vladimir Iglovikov et al., "TernausNet: U-Net with VGG11 Encoder Pre-Trained on ImageNet for Image Segmentation", arXiv:1801.05746v1 [cs.CV], Jan. 17, 2018, 5 pages total.

Andrew G. Howard et al., "MobileNets: Efficient Convolutional Neural Networks for Mobile Vision Applications", arXiv:1704.04861v1 [cs.CV], Apr. 17, 2017, 9 pages total.

* cited by examiner

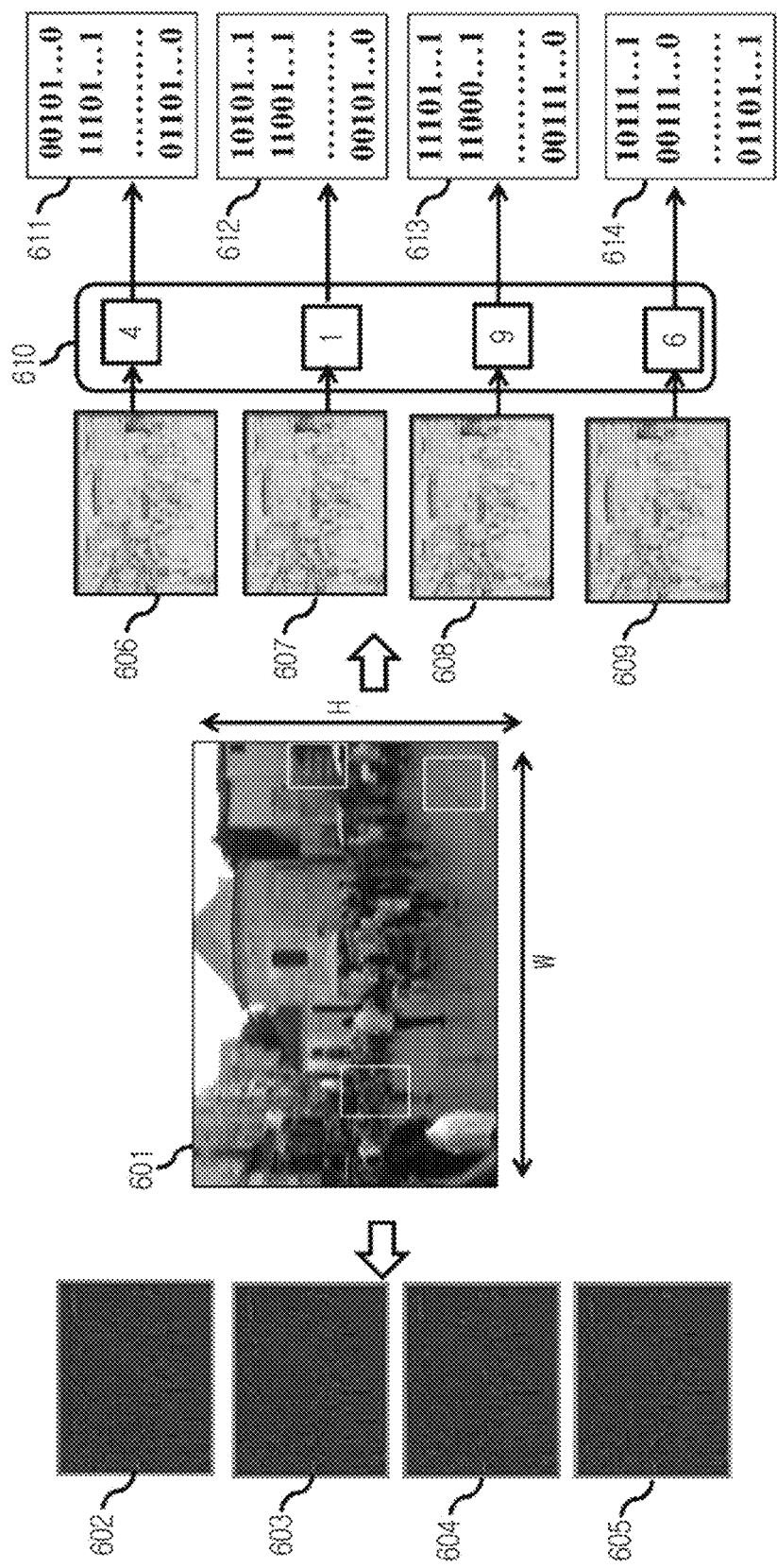

METHOD AND ELECTRONIC DEVICE FOR DEBLURRING BLURRED IMAGE

CROSS-REFERENCE TO RELATED APPLICATION(S)

This application is based on, and claims priority under 35 U.S.C. § 119 to an Indian Patent Application No. 201941051319 (provisional specification), filed on Dec. 11, 2019, and Indian Patent Application No. 201941051319 (complete specification), filed on Sep. 8, 2020, in the Indian Intellectual Property Office, the entire disclosures of which are herein incorporated by reference.

BACKGROUND

1. Field

The disclosure relates to image processing, and more specifically to a method and an electronic device for deblurring a blurred image.

2. Description of Related Art

A clarity of details in a photographed digital image is a major factor that determines a quality of the photographed digital image. The clarity of details in certain photographed digital images is subject to degradation due to environmental factors (e.g., lighting, temperature, etc.) and factors depending on an image capturing device. Two major sources that degrade the clarity of details in the image are noises from an imaging sensor of the image capturing device and a blur present in the image. The blur can be introduced to the image in a number of ways while capturing the image. For example, the blur may occur in the image due to a low lighting in a scene, a motion of the image capturing device or a subject being photographed, an incorrect focus, inherent features of the image capturing device such a pixel size of the imaging sensor, a resolution of the imaging sensor, or a usage of anti-aliasing filters on the imaging sensor, etc.

Techniques for deblurring a blurred image have been proposed for recovering a sensible and meaningful image from a blurred image. In the related art method, the blurred image is deblurred using deconvolution operations, which require an accurate knowledge on blur features in the blurred image. However, recovering the blur features from a single blurred image is a difficult task due to a loss of details in the image.

SUMMARY

Provided are a method and an electronic device for deblurring a blurred image. The method and the electronic device according to one or more embodiments may achieve a high accuracy and performance in image deblurring within three stages of encoding and decoding of the blurred image. Also, a computation and a memory requirement at the electronic device for deblurring a blurred image may be reduced by about half compared to that of the related art systems for deblurring the blurred image. Also, the method and the electronic device according to one or more embodiments may reduce consumption of computational and storage resources in the electronic device for generating the deblurred image, and may quickly generate the deblurred image within a certain number of stages (e.g., three stages) of encoding and decoding.

One or more embodiments may optimize traditional convolutions for extracting a coarser blur feature and a finer blur feature from the blurred image. A computational efficiency of the electronic device may improve in deblurring the blurred image compared to the related art systems based on optimizing the traditional convolutions.

One or more embodiments may learn deblurring the blurred image using a point-wise convolution, and learn a color correction required in the blurred image during low-light and underwater scenarios using a depth-wise convolution. The electronic device may combine output of both the learnings to generate a low-light enhanced deblurred image or a color corrected deblurred image.

One or more embodiments may reduce an inference time of the electronic device to extract the relevant blur features from the blurred image. Therefore, the electronic device may quickly deblur the blurred image. Since, the inference time of the electronic device is very small, the proposed method is suitable for high frame rate video capturing applications such as a slow-motion video recording and a video deblurring.

In accordance with an aspect of the disclosure, there is provided a method for deblurring a blurred image, the method including: encoding, by at least one processor, a blurred image at a plurality of stages of encoding to obtain an encoded image at each of the plurality of stages; decoding, by the at least one processor, an encoded image obtained from a final stage of the plurality of stages of encoding by using an encoding feedback from each of the plurality of stages and a machine learning (ML) feedback from at least one ML model; and generating, by the at least one processor, a deblurred image in which at least one portion of the blurred image is deblurred based on a result of the decoding.

The encoding may include: generating a first set of feature maps corresponding to a channel number by performing a point-wise convolution on the blurred image; generating a second set of feature maps corresponding to the channel number by performing a depth-wise convolution on the blurred image; and generating a set of threshold-based blur feature maps using the first set of feature maps and the second set of feature maps, and encoding the blurred image by using the set of threshold-based blur feature maps.

The generating the set of threshold-based blur feature maps may include: determining a threshold weight of a feature map of the first set of feature maps using the at least one ML model, wherein the threshold weight of the feature map indicates one of: an overall blur weightage of the feature map and a minimum blur feature value to be present in the feature map; comparing each pixel value of the feature map with the threshold weight corresponding to the feature map; and generating a threshold feature map mask corresponding to the feature map based on a result of the comparing.

The method may further include: generating, by the at least one processor, the set of threshold-based blur feature maps by performing an element-wise product between the second set of feature maps and a set of threshold feature map masks corresponding to respective feature maps of the first set of feature maps.

The at least one ML model may be trained to generate the threshold weight of the feature map by: generating a threshold vector including threshold weights with random values at each stage of encoding, where each threshold weight in the threshold vector corresponds to each feature map of the first set of feature maps; learning updates in values of the threshold weights at each stage of encoding during a training phase of the at least one ML model; and updating the values of the threshold weights based on the learning in response to completing the training phase.

The decoding may include: decoding the encoded image obtained from the final stage of the plurality of stages of encoding by performing deconvolution at each stage of decoding and using encoded images obtained from remaining stages of the plurality of stages of encoding and the ML feedback from the at least one ML model.

The at least one ML model may be trained by: determining a weightage of at least one portion in a plurality of blurred images based on a plurality of deblurred images, the plurality of deblurred images corresponding to the plurality of blurred images; training each of a neural network node of the at least one ML model based on the weightage; and training the at least one ML model based on the trained neural network node.

The method may further include storing, by the at least one processor, the deblurred image.

The encoding may include performing a plurality of stages of point-wise convolution on the blurred image to obtain the encoded image.

The encoding may include performing a plurality of stages of depth-wise convolution on the blurred image to obtain the encoded image.

In accordance with an aspect of the disclosure, there is provided an electronic device for deblurring a blurred image, the electronic device including: at least one memory configured to store program code; and at least one processor configured to read the program code and operate to: encode a blurred image at a plurality of stages of encoding to obtain an encoded image at each of the plurality of stages; decode an encoded image obtained from a final stage of the plurality of stages of encoding by using an encoding feedback from each of the plurality of stages and a machine learning (ML) feedback from at least one ML model; and generate a deblurred image in which at least one portion of the blurred image is deblurred based on a result of the decoding.

The at least one processor may be further configured to encode the blurred image by: generating a first set of feature maps corresponding to a channel number by performing a point-wise convolution on the blurred image; generating a second set of feature maps corresponding to the channel number by performing a depth-wise convolution on the blurred image; and generating a set of threshold-based blur feature maps using the first set of feature maps and the second set of feature maps and encoding the blurred image by using the set of threshold-based blur feature maps.

The at least one processor may be further configured to generate the set of threshold-based blur feature maps by: determining a threshold weight of a feature map of the first set of feature maps using the at least one ML model, wherein the threshold weight of the feature map indicates one of: an overall blur weightage of the feature map and a minimum blur feature value to be present in the feature map; comparing each pixel value of the feature map with the threshold weight corresponding to the feature map; and generating a threshold feature map mask corresponding to the feature map based on a result of the comparing.

The at least one processor may be further configured to: generate the set of threshold-based blur feature maps by performing an element-wise product between the second set of feature maps and a set of threshold feature map masks corresponding to respective feature maps of the first set of feature maps.

The at least one ML model may be trained to generate the threshold weight for the feature map by: generating a threshold vector including threshold weights with random values at each stage of encoding, where each threshold weight in the threshold vector corresponds to each feature map of the first set of feature maps; learning updates in values of the threshold weights at each stage of encoding during a training phase of the at least one ML model; and updating the values of the threshold weights based on the learning in response to completing the training phase.

The at least one processor may be configured to: decode the encoded image obtained from the final stage of the plurality of stages of encoding for the plurality of stages by performing deconvolution at each stage of decoding and using the encoded images obtained from remaining stages of the plurality of stages of encoding and the ML feedback from the at least one ML model.

The at least one ML model may be trained by: determining a weightage of at least one portion in a plurality of blurred images based on a plurality of deblurred images, the plurality of deblurred images corresponding to the plurality of blurred images; train each of a neural network node of the at least one ML model based on the weightage; and train the at least one ML model based on the trained neural network node.

The at least one processor may be further configured to store the deblurred image.

The at least one processor may be further configured to encode the blurred image by performing a plurality of stages of point-wise convolution on the blurred image or a plurality of stages of depth-wise convolution.

In accordance with an aspect of the disclosure, there is provided a non-transitory storage medium storing computer code executable by at least one processor to perform the above method.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 6A and 6B illustrate an example scenario of generating an encoded image of a blurred image of a street, according to an embodiment.

DETAILED DESCRIPTION

Figure 1A:
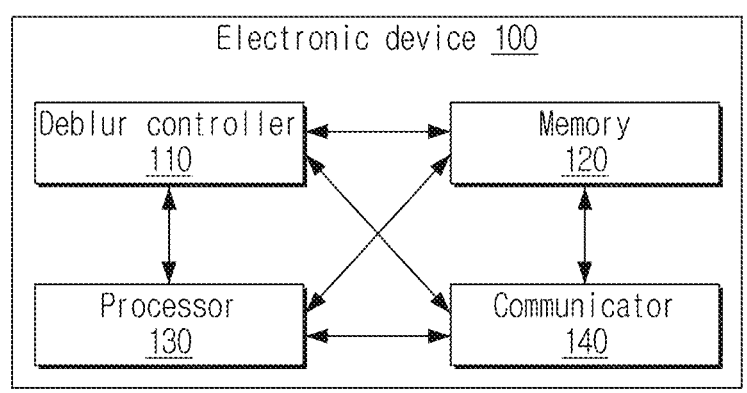
FIGS. 1A and 1B are block diagrams of an electronic device for deblurring a blurred image, according to embodiments.

The embodiments and various features and advantageous details thereof are explained more fully with reference to the non-limiting embodiments that are illustrated in the accompanying drawings and detailed in the following description. Descriptions of well-known components and techniques are omitted so as to not unnecessarily obscure the embodiments herein. Also, the various embodiments described herein are not necessarily mutually exclusive and some embodiments may be combined with one or more other embodiments. The term "or" as used herein, refers to a non-exclusive or, unless otherwise indicated. The examples used herein are intended merely to facilitate an understanding of ways in which the embodiments herein may be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, may be physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, embodiments herein provide a method for deblurring a blurred image in an electronic device. The method includes receiving, by the electronic device, the blurred image. The method includes encoding, by the electronic device, the blurred image at a plurality of stages to obtain an encoded image at each stage of the encoding. The method includes generating, by the electronic device, a deblurred image by decoding the encoded image obtained from a final stage of encoding of the plurality of stages by using an encoding feedback from each stage of the encoding and a machine learning (ML) feedback from at least one ML model to deblur at least one portion of the blurred image. The method includes storing, by the electronic device, the deblurred image.

Unlike the related art methods and systems, the method according to an embodiment allows the electronic device to achieve a high accuracy in image deblurring within a certain number of stages (e.g., three stages) of encoding and decoding of the blurred image. Hence, a computation and a memory requirement at the electronic device may be reduced by about half compared to that of the related art systems for deblurring the blurred image. Thus, the method according to an embodiment may reduce consumption of the computational and storage resources in the electronic device for generating the deblurred image. Moreover, the electronic device may quickly generate the deblurred image within the certain number of stages (e.g., three stages) of encoding and decoding.

Unlike the related art methods and systems, an inference time of the electronic device according to an embodiment to extract relevant blur features from the blurred image of the electronic device is very small (e.g., 18 milliseconds (ms)). Therefore, the electronic device may quickly deblur the blurred image. Since, the inference time of the electronic device is very small, the method and the electronic device according to an embodiment may be suitable for a high frame rate video capturing application such as a slow-motion video recording and a video deblurring.

Unlike the related art methods and systems, the method according to an embodiment is very effective in deblurring an image that is blurred in low-light and underwater scenarios. The electronic device according to an embodiment may learn color correction required in low-light and underwater scenarios using a depth-wise convolution. The electronic device may deblur the images using a point-wise convolution. Outputs from the depth-wise convolution and the point-wise convolution may be combined by the electronic device to generate a final low-light enhanced deblurred image.

Hereinafter, embodiments are described with reference to the drawings.

Figure 1B:
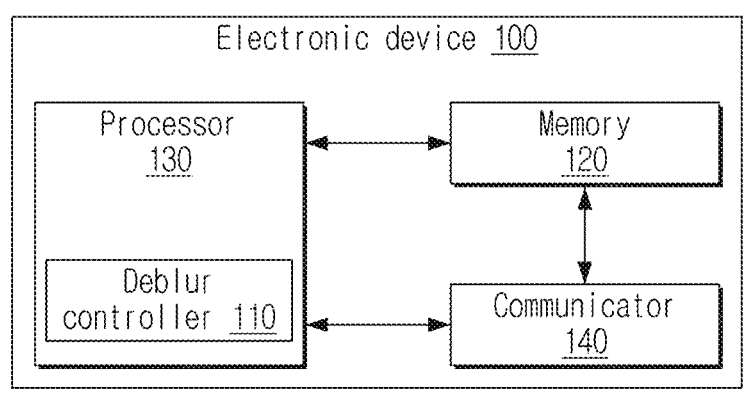

FIG. 1A and FIG. 1B are block diagrams of an electronic device 100 for deblurring a blurred image, according to embodiments. Examples for the electronic device 100 include, but not limited to, a smart phone, a tablet computer, a personal digital assistance (PDA), an Internet of Things (IoT), a camera, and the like.

In an embodiment, as shown in FIG. 1A, the electronic device 100 may include a deblur controller 110, a memory 120, a processor 130, and a communicator 140. In another embodiment, as shown in FIG. 1B, the electronic device 100 may include the memory 120, the processor 130, and the communicator 140. Here, the processor 130 may include the deblur controller 110.

The deblur controller 110 may be configured to receive a blurred image. In an embodiment, the deblur controller 110 may access the blurred image stored in the memory 120 or the blurred image captured through a camera of the electronic device 100. In another embodiment, the deblur controller 110 may receive the blurred image from an external device through the communicator 140.

Figure 5A:
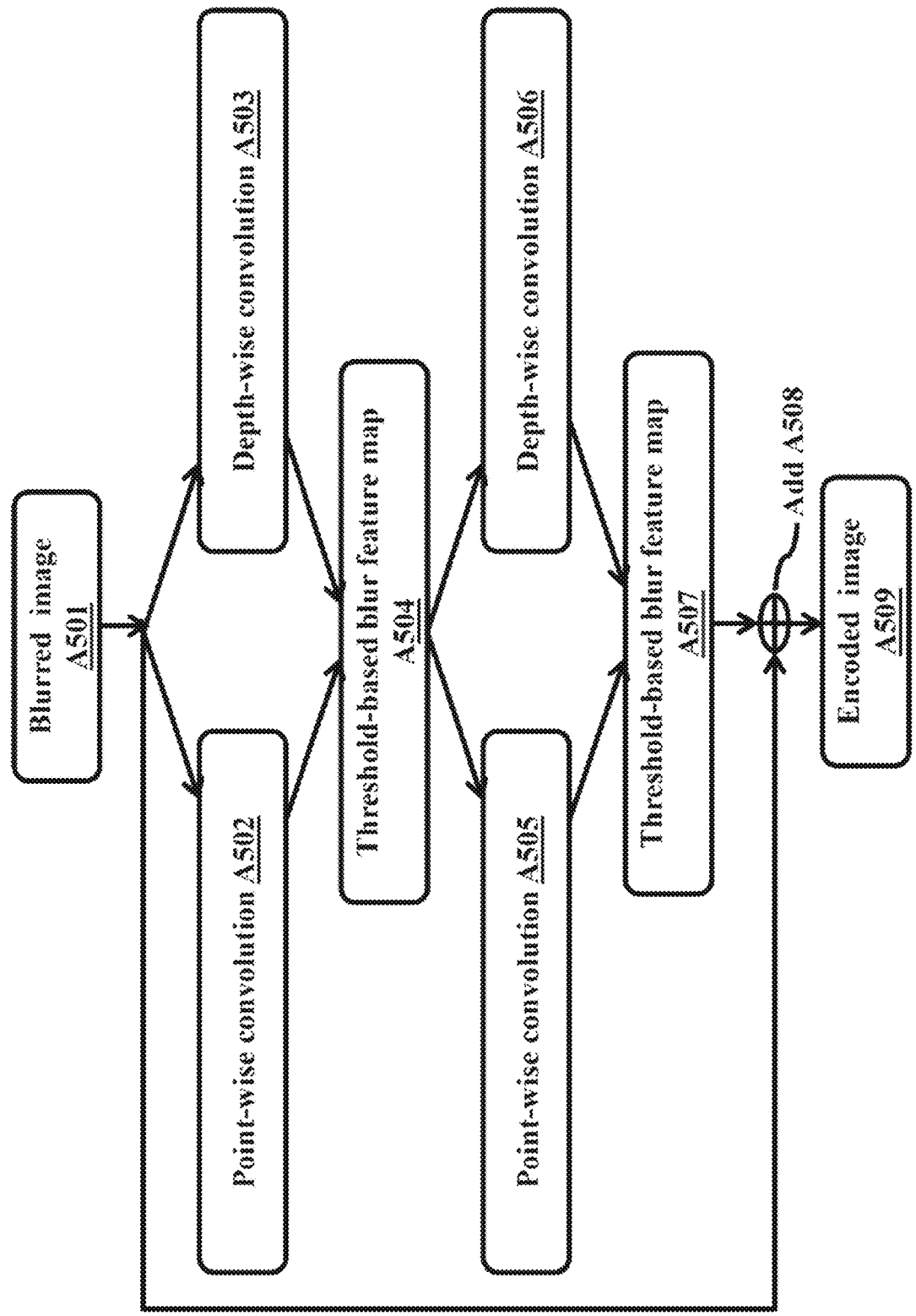
FIGS. 5A, 5B, and 5C are flow diagrams illustrating operations ResBlock for generating an encoded image using a blurred image, according to embodiments.
Figure 5B:
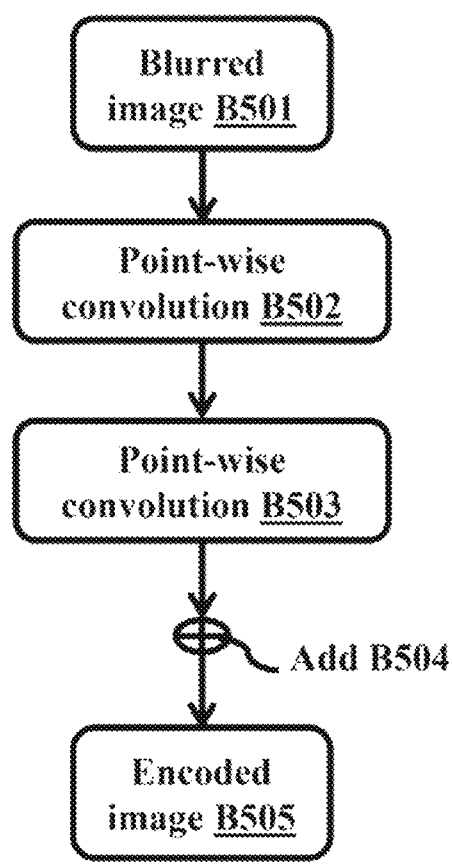
Figure 5C:
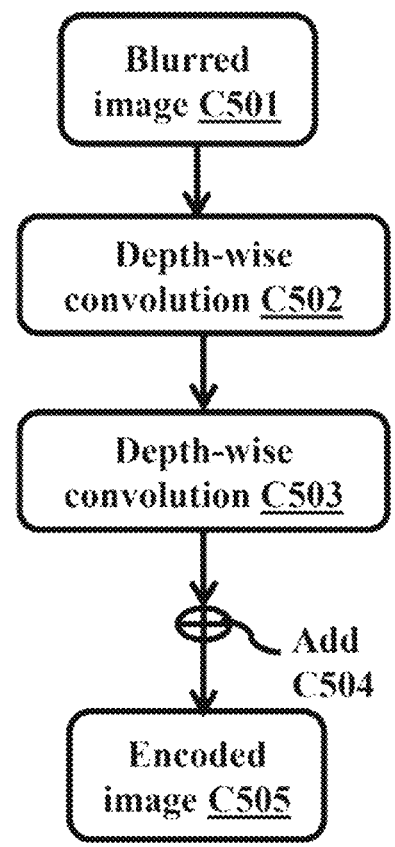

The deblur controller 110 may be configured to encode the blurred image at a plurality of stages to obtain an encoded image at each stage of encoding. In an embodiment, a stage of encoding including performing a convolution (or an operation equivalent to the convolution) on the blurred image and feeding an output of the convolution to an encoder residual block or ResBlock (e.g., residual neural network block or ResNet block with skip connection). Further, an output of one stage of encoding is fed to a next stage of the encoding. Three designs of encoder ResBlocks are shown in FIGS. 5A-5C, where a first design of the encoder ResBlock is shown in FIG. 5A. Referring to FIG. 5A, the deblur controller 110 may be configured to generate a first set of feature maps corresponding to a channel number (e.g., 12) by performing a point-wise convolution on the blurred image. The deblur controller 110 may be configured to generate a second set of feature maps corresponding to the channel number by performing a depth-wise convolution on the blurred image. The deblur controller 110 may be configured to generate a set of threshold-based blur feature maps using the first set of feature maps and the second set of feature maps for encoding the blurred image. The designs of the encoder ResBlock will be further described in detail later. Here, "channel" refers to the number of the generated feature maps at each level or block across the depth of the network, In an embodiment, the deblur controller 110 may be configured to determine a threshold weight of a feature map of the first set of feature maps using at least one ML model 113 (shown in FIG. 2). The threshold weight of the feature map indicates an overall blur weightage of the feature map or a minimum blur feature value that should be present in the feature map. The deblur controller 110 may be configured to compare each pixel value of the feature map with the threshold weight corresponding to the feature map. The deblur controller 110 may be configured to generate a threshold feature map mask corresponding to the feature map based on a result of the comparison. A value in the threshold feature map mask is zero when a pixel value of the feature map is smaller than the threshold weight. A value in the threshold feature map mask is one when the pixel value of the feature map is not smaller than the threshold weight. The deblur controller 110 may be configured to generate a set of threshold feature map masks using the threshold feature map mask corresponding to each feature map of the first set of feature maps. The deblur controller 110 may be configured to perform an element-wise product (e.g., pixel-wise XOR product, pixel-wise XNOR product, Hadamard operations, etc.) between the second set of feature maps and the set of threshold feature map masks for generating the threshold-based blur feature maps.

In an embodiment, the deblur controller 110 may be configured to train the at least one ML model 113 to generate the threshold weight for the feature map. The deblur controller 110 may be configured to generate a threshold vector including threshold weights with random values at each stage of encoding. Each threshold weight in the threshold vector corresponds to each feature map of the first set of feature maps. Further, the at least one ML model 113 learns of updates in values of the threshold weights at each stage of encoding during a training phase using backpropagation. The deblur controller 110 may be configured to update the values of the threshold weights based on the learning in response to completing the training phase. In an embodiment, "learning" is performed to "minimize the loss, which is the absolute difference between the DNN model generated output and ground truth image after each pass or iteration".

Unlike the related art methods and systems, the deblur controller 110 may be configured to train the ML model 113 using images with three different scales such as an original image (e.g., having a dimension of 1280×720), half scaled original image (e.g., having a dimension of 640×360), quarter scaled original image (e.g., having a dimension of 320×180). The ML model 113 learns to handle scale independent deblurring with only one level, which causes to achieve high accuracy with (1/N)-th of size of the ML model 113, (1/N)-th computation parameters and inference time as compared to the related art multi-level architectures. 'N' denotes the number of levels in the related art multi-level architecture (e.g., N=3 for a simple recurrent network (SRN) deblur method). In an embodiment, the ML model 113 is trained with an adaptive learning rate of $1\times10^{-4}$ which adjusts with number of epochs. An Euclidean loss function may be used in the training with Adam optimiser on a batch size of 16.

Figure 4:
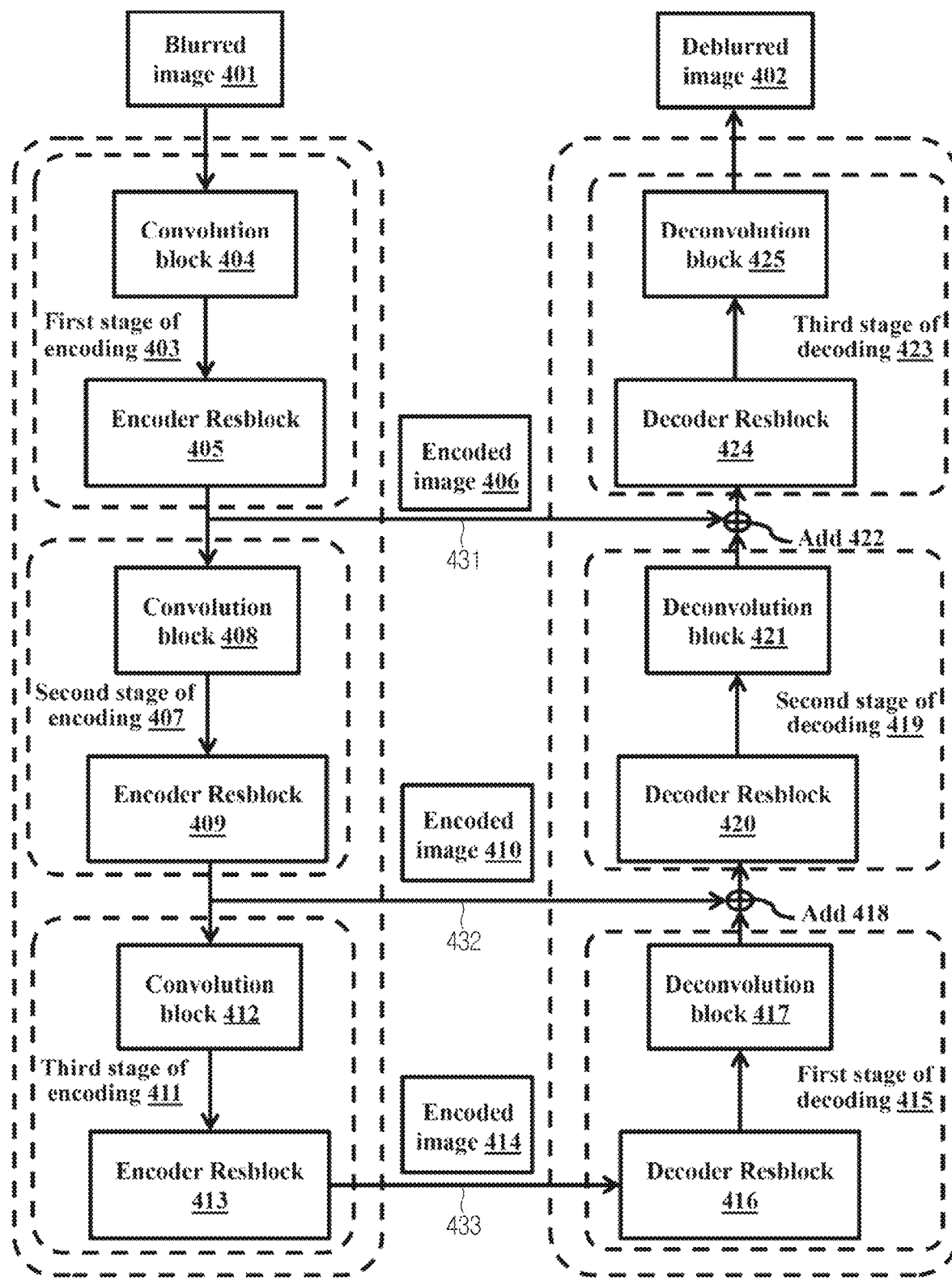
FIG. 4 illustrates a schematic diagram for recovering a deblurred image from a blurred image, according to an embodiment.

The deblur controller 110 may be configured to generate a deblurred image by decoding the encoded image obtained from a final stage of the plurality of stages of encoding by using an encoding feedback from each stage of encoding and a ML feedback from at least one ML model 113 to deblur at least one portion of the blurred image. Here, the encoding feedback represents the connection between the encoder and its respective decoder stages at same level. Referring to FIG. 4, the first connection (431) from encoder (on left side) to decoder (on right side) represents the encoding feedback. The second connection (432) from encoder (on left side) to decoder (on right side) represents the encoding feedback. The third connection (433) from encoder (on left side) to decoder (on right side) represents the encoding feedback. Also, ML (Machine Learning) feedback represents, taking the output processed by one or more ML models as an input.

In an embodiment, the deblur controller 110 may be configured to decode the encoded image obtained from the final stage of encoding of the plurality of stages (e.g., 12) by performing deconvolution (or operation equivalent to the deconvolution) at each stage of decoding and using the encoded image obtained from the remaining stages of encoding and the ML feedback from the at least one ML model 113. In an embodiment, the encoded image obtained from the final stage of encoding is a lower dimension feature map. Here, each encoder block has a certain number of encoder stages and remaining stages refers to the stages that come after the specified encoder stage up to the last encoder stage in the proposed ML model.

The deblur controller 110 may be configured to de-blur the lower dimension feature map and up-sample the lower dimension feature map at every stage by performing deconvolution (e.g., up sample and concat).

In an embodiment, the deblur controller 110 may be configured to train the at least one ML model 113 for obtaining the ML feedback. The deblur controller 110 may be configured to receive a plurality of blurred images. The deblur controller 110 may be configured to receive a plurality of deblurred images (also called as ground truth images) corresponding to the plurality of blurred images. The deblur controller 110 may be configured to determine a weightage of at least one portion in the blurred images based on the plurality of deblurred images. The deblur controller 110 may be configured to train each of a neural network node of the at least one ML model based on the weightage. Here, the neural network node refers to a single operation or a group of operations in the ML model. The deblur controller 110 may be configured to train the at least one ML model 113 based on the trained neural network node. Here, the process of training the neural network node and training the ML model may be similar.

The deblur controller 110 may be configured to store the deblurred image to the memory 120, in response to generating the deblurred image. In an embodiment, the processor 130 may control the electronic device 100 to display the deblurred image.

The memory 120 may include non-volatile storage elements. Examples of the non-volatile storage elements may include magnetic hard discs, optical discs, floppy discs, flash memories, or forms of an electrically programmable memory (EPROM) or an electrically erasable and programmable memory (EEPROM).

In addition, the memory 120 may, in some examples, be considered a non-transitory storage medium. The term "non-transitory" may indicate that the storage medium is not embodied in a carrier wave or a propagated signal. However, the term "non-transitory" should not be interpreted that the memory 120 is non-movable. In some examples, the memory 120 may be configured to store a larger amount of information. In certain examples, a non-transitory storage medium may store data that may change over time (e.g., in random access memory (RAM) or cache).

The processor 130 may be configured to execute instructions stored in the memory 120.

The communicator 140 may be configured to communicate internally between hardware components in the electronic device 100. The communicator 140 may be configured to communicate with at least one external device through various communication methods (e.g., Wi-Fi, Bluetooth, UWB (Ultra-wideband), LAN (local area network), etc.).

At least one of the plurality of modules described herein may be implemented through the ML model 113. A function associated with ML model 113 may be performed through the memory 120, and the processor 130.

The processor 130 may include one or a plurality of processors. The one or a plurality of processors may be a general-purpose processor, such as a central processing unit (CPU), an application processor (AP), or the like, a graphics-only processing unit such as a graphics processing unit (GPU), a visual processing unit (VPU), and/or an artificial intelligence (AI)-dedicated processor such as a neural processing unit (NPU).

In an embodiment, the one or a plurality of processors control processing of input data in accordance with a predefined operating rule or the ML model 113 stored in the memory 120. The predefined operating rule or the ML model 113 is provided through training or learning.

Here, the predefined operating rule or the ML model 113 being provided through learning means that, by applying a learning method to a plurality of learning data, the predefined operating rule or the ML model 113 of a desired characteristic is provided. The learning may be performed in the electronic device 100 in which machine learning according to an embodiment is performed, and/or may be implemented through a separate server/system. The learning method is a method for training a predetermined target device (for example, a robot or the electronic device 100) using a plurality of learning data to cause, allow, or control the target device to make a determination or prediction. Examples of learning methods include, but are not limited to, supervised learning, unsupervised learning, semi-supervised learning, or reinforcement learning.

The ML model 113 may include a plurality of neural network layers. Each layer has a plurality of weight values, and performs a layer operation through calculation of a previous layer and an operation of a plurality of weights. Examples of neural networks include, but are not limited to, Convolutional Neural Network (CNN), Deep Neural Network (DNN), Recurrent Neural Network (RNN), Restricted Boltzmann Machine (RBM), Deep Belief Network (DBN), Bidirectional Recurrent Deep Neural Network (BRDNN), Generative Adversarial Networks (GAN), and deep Q-networks.

While FIGS. 1A and 1B show some components of the electronic device 100, it is to be understood that other embodiments are not limited thereto. In other embodiments, the electronic device 100 may include less or more number of components than those shown in FIGS. 1A and 1B. The labels or names of the components are used only for illustrative purposes and do not limit the scope of the disclosure. One or more components may be combined together to perform the same or substantially similar function for deblurring the blurred image. For example, the electronic device 100 may include at least one of a display, a speaker and an input interface.

Figure 2:
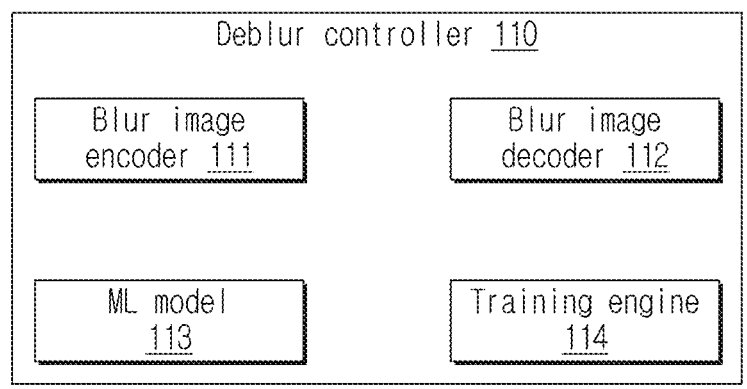
FIG. 2 is a block diagram of a deblur controller of an electronic device for generating a deblurred image, according to an embodiment.

FIG. 2 is a block diagram of the deblur controller 110 of the electronic device 100 for generating a deblurred image by decoding an encoded image, according to an embodiment.

In an embodiment, the deblur controller 110 may include a blur image encoder 111, a blur image decoder 112, the ML model 113, and a training engine 114. The blur image encoder 111 receives the blurred image. The blur image encoder 111 may encode the blurred image at a plurality of stages to obtain an encoded image at each stage of encoding.

The blur image encoder 111 may generate a first set of feature maps corresponding to the channel number by performing point-wise convolution on the blurred image. The blur image encoder 111 may generate a second set of feature maps corresponding to the channel number by performing depth-wise convolution on the blurred image. The deblur controller 110 may be configured to generate a set of threshold-based blur feature maps using the first set of feature maps and the second set of feature maps for encoding the blurred image.

In an embodiment, the blur image encoder 111 may determine the threshold weight of the feature map of the first set of feature maps using at least one ML model 113. In an embodiment, the threshold weight is determined for a luma value in the feature map. The blur image encoder 111 may compare each pixel value of the feature map with the threshold weight corresponding to the feature map. The blur image encoder 111 may generate the threshold feature map mask corresponding to the feature map based on the comparison. The blur image encoder 111 may generate the set of threshold feature map masks using the threshold feature map mask corresponding to each feature map of the first set of feature maps. The blur image encoder 111 may perform the element-wise product between the second set of feature maps and the set of threshold feature map masks for generating the threshold-based blur feature maps.

In an embodiment, the training engine 114 may train the at least one ML model 113 to generate the threshold weight for the feature map. The training engine 114 may generate the threshold vector including the threshold weights with random values at each stage of encoding. The training engine 114 may update the values of the threshold weights based on the learning at the ML model 113 about updates in values of the threshold weights, in response to completing the training phase of the ML model 113.

The blur image decoder 112 may generate the deblurred image by decoding the encoded image obtained from the final stage of encoding of the plurality of stages by using the encoding feedback from each stage of encoding and the ML feedback from at least one ML model 113 to deblur at least one portion of the blurred image. In an embodiment, the blur image decoder 112 may decode the encoded image obtained from the final stage of encoding of the plurality of stages (e.g., 12) by performing deconvolution (or operation equivalent to the deconvolution) at each stage of decoding and using the encoded image obtained from the remaining stages of encoding and the ML feedback from the at least one ML model 113.

In an embodiment, the training engine 114 may train the at least one ML model 113 for obtaining the ML feedback. The training engine 114 may receive the plurality of blurred images. The training engine 114 may receive the plurality of deblurred images corresponding to the plurality of blurred images. The training engine 114 may determine the weightage of at least one portion in the blurred images based on the plurality of deblurred images. The training engine 114 may train each of a neural network node of the at least one ML model 113 based on the weightage. The training engine 114 may train the at least one ML model 113 based on the trained neural network node.

While FIG. 2 shows some components of the deblur controller 110, it is to be understood that other embodiments are not limited thereto. In other embodiments, the deblur controller 110 may include less or more number of components than those shown in FIG. 2. The labels or names of the components are used only for illustrative purpose and does not limit the scope of the disclosure. One or more components may be combined together to perform same or substantially similar for generating the deblurred image.

Figure 3:
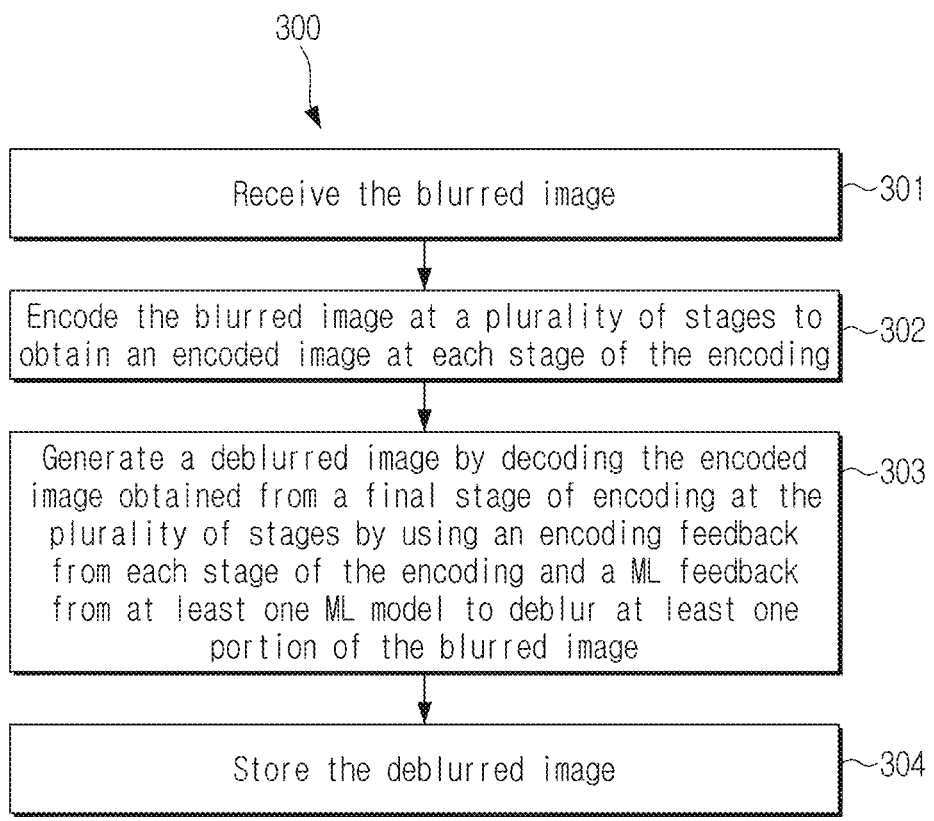
FIG. 3 is a flow diagram illustrating a method for deblurring a blurred image, according to an embodiment.

FIG. 3 is a flow diagram 300 illustrating a method for deblurring the blurred image using the electronic device 100, according to an embodiment.

At operation 301, the method includes receiving a blurred image. In an embodiment, the method allows the blur image encoder 111 to receive the blurred image.

At operation 302, the method includes encoding the blurred image at a plurality of stages to obtain an encoded image at each stage of the encoding. In an embodiment, the method allows the blur image encoder 111 to encode the blurred image at the plurality of stages to obtain an encoded image at each stage of the encoding.

At operation 303, the method includes generating the deblurred image by decoding the encoded image obtained from the final stage of encoding of the plurality of stages by using the encoding feedback from each stage of the encoding and the ML feedback from the at least one ML model 113 to deblur at least one portion of the blurred image. In an embodiment, the method allows the blur image decoder 112 to generate the deblurred image by decoding the encoded image obtained from the final stage of encoding of the plurality of stages by using the encoding feedback from each stage of the encoding and the ML feedback from the at least one ML model 113 to deblur at least one portion of the blurred image.

At operation 304, the method includes storing the deblurred image. In an embodiment, the method allows the memory 120 to store the deblurred image. In an embodiment, the method includes displaying the deblurred image on the display of the electronic device 100.

Various actions, functions, blocks, operations, or the like in the flow diagram 300 may be performed in the order presented, in a different order or simultaneously. Further, in some embodiments, some of the actions, functions, blocks, operations, or the like may be omitted, added, modified, skipped, or the like without departing from the scope of the disclosure.

FIG. 4 illustrates a schematic diagram for recovering the deblurred image from the blurred image using the electronic device 100, according to an embodiment. The schematic diagram illustrates three stages of encoding and decoding according to the method of an embodiment to achieve a high accuracy and performance in deblurring the blurred image. However, the disclosure is not limited thereto, and the number of stages of encoding may be any number other than three. The accuracy and performance in deblurring the blurred image increase according to an increase in the stages of encoding and decoding.

A first stage of encoding 403 includes a convolution block 404 and an encoder ResBlock 405. A second stage of encoding 407 includes a convolution block 408 and an encoder ResBlock 409. A third stage of encoding 411 includes a convolution block 412 and an encoder ResBlock 413. A first stage of decoding 415 includes a deconvolution block 417 and a decoder ResBlock 416. A second stage of decoding 419 includes a deconvolution block 421 and a decoder ResBlock 420. A third stage of decoding 423 includes a deconvolution block 425 and a decoder ResBlock 424.

In response to receiving a blurred image 401, the electronic device 100 performs convolution on the blurred image 401 using the convolution block 404 to increase a number of channels for better representation. The electronic device 100 feeds feature maps of the blurred image 401 obtained from the convolution block 404 to the encoder ResBlock 405 for encoding the feature maps. The encoder ResBlock 405 extracts and models blur information in the blurred image 401 using learned filters to generate an encoded image 406. The electronic device 100 feeds the encoded image 406 from the encoder ResBlock 405 to the convolution block 408 of the second stage of encoding 407.

The convolution block 408 performs convolution on the encoded image 406 to encode the modelled blur information into lower feature map using learned filters. In an embodiment, the convolution block 408 may perform convolution on the encoded image 406 to encode the modelled blur information into lower embedded space using learned filters. The electronic device 100 feeds an output from the convolution block 408 to the encoder ResBlock 409 for encoding the output from the convolution block 408. The encoder ResBlock 409 extracts and models the blur information from the lower feature map (or the lower embedded space) using the learned filters to generate an encoded image 410. The electronic device 100 feeds the encoded image 410 from the encoder ResBlock 409 to the convolution block 412 of the third stage of encoding 411.

The convolution block 412 performs convolution on the encoded image 410 to encode the modelled blur information into lower feature map using learned filters. In an embodiment, the convolution block 412 may perform convolution on the encoded image 410 to encode the modelled blur information into lower embedded space using learned filters. The electronic device 100 feeds an output from the convolution block 412 to the encoder ResBlock 413 for encoding the output from the convolution block 412. The encoder ResBlock 413 extracts and models the blur information from the lower feature map (or the lower embedded space) using the learned filters to generate an encoded image 414. The electronic device 100 feeds the encoded image 414 from the encoder ResBlock 413 to the decoder ResBlock 416 of the first stage of decoding 415.

The decoder ResBlock 416 applies learned filters on the encoded image 414 to generate a first decoded image. In other words, the decoder ResBlock 416 may generate a first decoded image by applying learned filters on the encoded image 414. The electronic device 100 feeds the first decoded image from the decoder ResBlock 416 to the deconvolution block 417 to increase a dimension of the first decoded image. The electronic device 100 adds (or merge) 418 the first decoded image from the deconvolution block 417 with the encoded image 410 for better reconstruction. Here, the increased dimension of the first decoded image may be the same as the dimension of the encoded image 410. The electronic device 100 feeds the first decoded image to the decoder ResBlock 420 of the second stage of decoding 419.

The decoder ResBlock 420 applies learned filters on the first decoded image to generate a second decoded image. In other words, the decoder ResBlock 420 may generate a second decoded image by applying learned filters on the first decoded image. The electronic device 100 feeds the second decoded image from the decoder ResBlock 420 to the deconvolution block 421 to increase a dimension of the second decoded image. The electronic device 100 adds (or merge) 422 the second decoded image from the deconvolution block 417 with the encoded image 406 for better reconstruction. Here, the increased dimension of the second decoded image may be the same as the dimension of the encoded image 406. The electronic device 100 feeds the second decoded image to the decoder ResBlock 424 of the third stage of decoding 423.

The decoder ResBlock 424 applies learned filters on the second decoded image to generate a third decoded image. The electronic device 100 feeds the third decoded image from the decoder ResBlock 424 to the deconvolution block 425. The deconvolution block 425 convolves the third decoded image to produce a 3 channel (e.g., Red, Green, Blue) deblurred image having the same dimension as that of the blurred image.

FIG. 5A-5C are flow diagrams illustrating operations performing by the encoder ResBlock 405 for generating the encoded image using the blurred image, according to an embodiment. The encoder ResBlocks 409, 413 may operate similar to the encoder ResBlock 405.

The first design of the encoder ResBlock 405 is shown in FIG. 5A.

In response to receiving a blurred image A501 at the encoder ResBlock 405 of the first design, the electronic device 100 performs point-wise convolution A502 and depth-wise convolution A503 on the blurred image A501. The electronic device 100 uses outputs from the point-wise convolution A502 and the depth-wise convolution A503 to generate a set of threshold-based blur feature map A504. The electronic device 100 performs point-wise convolution A505 and depth-wise convolution A506 on the set of threshold-based blur feature map A504. The electronic device 100 uses outputs from the point-wise convolution A505 and the depth-wise convolution A506 to generate a set of threshold-based blur feature map A507. The electronic device 100 adds (or merge) A508 the set of threshold-based blur feature map A507 and the blurred image A501 to construct the encoded image A509. That is, the electronic device 100 may perform the point-wise convolution and the depth-wise convolution in parallel.

The second design of the encoder ResBlock 405 is shown in FIG. 5B.

In response to receiving a blurred image B501 at the encoder ResBlock 405 of the second design, the electronic device 100 performs two stages of point-wise convolution B502, B503 on the blurred image A501. The electronic device 100 adds (or merge) B504 an output from the final stage of point-wise convolution B503 to construct the encoded image B505. While it is described that two stages of point-wise convolution are performed on the blurred image, the embodiments of the disclosure are not limited thereto and three or more stages of point-wise convolution may be performed.

The third design of the encoder ResBlock 405 is shown in FIG. 5C.

In response to receiving a blurred image C501 at the encoder ResBlock 405 of third design, the electronic device 100 performs two stages of depth-wise convolution C502, C503 on the blurred image A501. The electronic device 100 adds (or merge) C504 an output from the final stage of depth-wise convolution C503 to construct the encoded image C505. The third design of the encoder ResBlock 405 may be suitable for efficiently extracting coarser level blur features like edges, outlines, etc. from the blurred image C501 by performing only the depth-wise convolution on the blurred image C501. The third design of the encoder ResBlock 405 results in best (e.g., shortest) inference time among the three designs of the encoder ResBlock. While it is described that two stages of depth-wise convolution are performed on the blurred image, the embodiments of the disclosure are not limited thereto and three or more stages of depth-wise convolution may be performed.

The second design of the encoder ResBlock 405 may be suitable for efficiently extracting finer level blur features like individual pixels, etc. from the blurred image C501 by performing only the point-wise convolution on the blurred image C501. The third design of the encoder ResBlock 405 results in best (e.g., shortest) training time among the three designs of the encoder ResBlock 405.

The first design of the encoder ResBlock 405 is a combination of the second design and the third design of the encoder ResBlock 405 to produce a best quality output with the coarser and the finer level of blur features. The first design of the encoder ResBlock 405 produces best image quality results among the three designs by intelligently selecting relevant features from both the coarser and finer level blur features by generating the set of threshold-based blur feature map. The set of threshold-based blur feature map according to the first design of the encoder ResBlock 405 contains most relevant features from both the coarser and finer features, and eliminates outliers and redundant blur features. The set of threshold-based blur feature map is generated by performing a Hadamard product or a threshold-based blur feature selection operation, where outputs of the point-wise convolution are used as a selection filter on outputs of the depth-wise convolution. By performing the Hadamard product or threshold-based blur feature selection operation, the best blur features among both coarser and finer features are selected and pass to a next block. Thus, the first design of the encoder ResBlock 405 provides best visual quality and accuracy to the deblurred image.

Because the method according to an embodiment does not replace or decompose a traditional convolution, the deblurring of the image is performed with high accuracy. Also, because the method according to an embodiment includes optimizing the traditional convolution for extracting the coarser and/or finer blur feature, the computational efficiency of the electronic device 100 is improved compared to the related art systems. The first design of the encoder ResBlock 405 may be applied for deblurring in a multi-task scenario such as underwater deblurring or low-light deblurring that requires learning of two independent tasks. The electronic device 100 learns the deblurring task using the point-wise convolution, and learns other tasks such as low-light and/or underwater color correction using the depth-wise convolution. The electronic device 100 combines outputs of learning to obtain a low-light enhanced deblurred image and/or a color corrected deblurred image. The method according to an embodiment consumes lower memory and computation resources compared to the related art systems while achieving high accuracy and performance for deblurring the image.

Figure 5D:
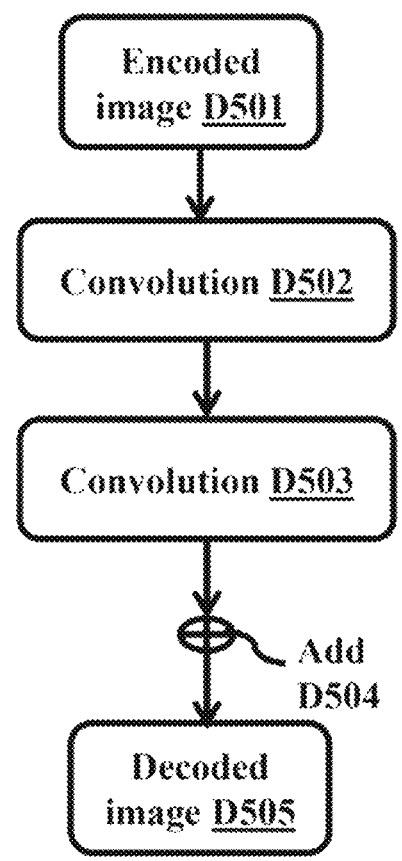
FIG. 5D is a flow diagram illustrating operations ResBlock for generating a decoded image using an encoded image, according to an embodiment.

FIG. 5D is a flow diagram illustrating operations performing by the decoder ResBlock 416 for generating a decoded image D505 by using an encoded image D501, according to an embodiment. The encoded image D501 may be the encoded image A509 or the encoded image B505 or the encoded image C505 described in FIGS. 5A-5C. The decoder ResBlocks 424, 420 may operate similar to the decoder ResBlock 416. In response to receiving the encoded image D501 at the decoder ResBlock 416, the electronic device 100 performs two stages of normal convolution D502, D503 on the encoded image D501. The electronic device 100 adds (or merge) D504 the output from the final stage of the normal convolution D503 to construct the decoded image D505.

Figure 6B:
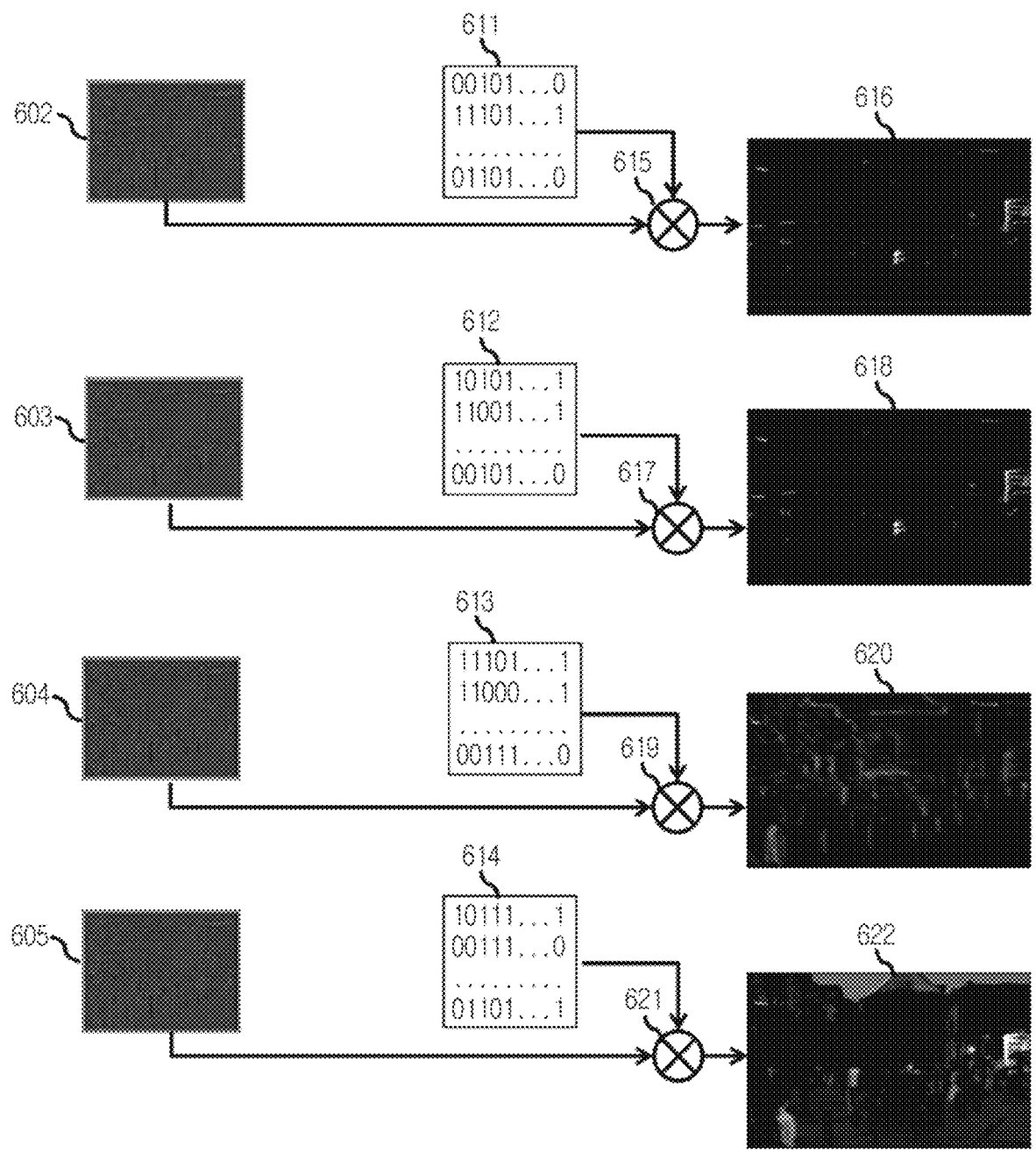

FIGS. 6A and 6B illustrate an example scenario of a blurred image 601 of a street, where the electronic device 100 generates the set of threshold-based blur feature maps of the blurred image 601, according to an embodiment.

As shown in FIG. 6A, the blurred image 601 captures an image of the street, where a dimension of the blurred image 601 is 720×1280, i.e., the height (H) of the blurred image 601 corresponds to a 720 pixel size and the width (W) of the blurred image 601 corresponds to a 1280 pixel size.

The electronic device 100 generates the first set of feature maps corresponding to a channel number of 4 by performing the point-wise convolution on the blurred image 601, where the first set of feature maps includes four feature maps 606, 607, 608, 609. The dimension of each of the feature maps 606-609 in the first set of feature maps is the same as that of the blurred image 601. The electronic device 100 generates the second set of feature maps corresponding to the channel number of 4 by performing the depth-wise convolution on the blurred image 601, where the second set of feature maps includes four feature maps 602, 603, 604, 605. The dimension of each of the feature maps 602-605 in the second set of feature maps is the same as that of the blurred image 601. The electronic device 100 generates a threshold vector 610 corresponding to the first set of feature maps, where the electronic device 100 determines threshold weights of 4, 1, 9, 6 in the threshold vector 610 using the ML model 113. The threshold weights 4, 1, 9, 6 are determined for the feature maps 606, 607, 608, 609 respectively.

The electronic device 100 compares each pixel value of the feature map 606 with the threshold weight 4 corresponding to the feature map 606. The electronic device 100 generates a threshold feature map mask 611 corresponding to the feature map 606 based on the comparison. The electronic device 100 compares each pixel value of the feature map 607 with the threshold weight 1 corresponding to the feature map 607. The electronic device 100 generates a threshold feature map mask 612 corresponding to the feature map 607 based on the comparison. The electronic device 100 compares each pixel value of the feature map 608 with the threshold weight 9 corresponding to the feature map 608. The electronic device 100 generates a threshold feature map mask 613 corresponding to the feature map 608 based on the comparison. The electronic device 100 compares each pixel value of the feature map 609 with the threshold weight 6 corresponding to the feature map 609. The electronic device 100 generates a threshold feature map mask 614 corresponding to the feature map 609 based on the comparison. The dimension of each of the threshold feature map masks 611-614 is the same as that of the blurred image 601. The threshold feature map masks are selected as relevant blur features and the blur features corresponding to the pixel values of '0' are ignored and considered as irrelevant. Therefore, most relevant blur features (e.g., highlighted or bright in the image) are extracted from the feature map and irrelevant blur features (e.g., dark in image) are ignored from the feature map.

As shown in FIG. 6B, the electronic device 100 performs an element-wise Hadamard product 615 between the feature map 602 in the second set of feature maps and the threshold feature map mask 611 to generate a threshold-based blur feature map 616. The electronic device 100 performs an element-wise Hadamard product 617 between the feature map 603 in the second set of feature maps and the threshold feature map mask 612 to generate a the threshold-based blur feature map 618. The electronic device 100 performs an element-wise Hadamard product 619 between the feature map 604 in the second set of feature maps and the threshold feature map mask 613 to generate a threshold-based blur feature map 620. The electronic device 100 performs an element-wise Hadamard product 621 between the feature map 605 in the second set of feature maps and the threshold feature map mask 614 to generate a threshold-based blur feature map 622. The dimension of each of the threshold-based blur feature maps 616, 618, 620, 622 is the same as that of the blurred image 601.

FIGS. 7A-7E illustrate a comparison of a blurred image with deblurred images, according to an embodiment.

Figure 7A:
FIGS. 7A, 7B, 7C, 7D, and 7E illustrate a comparison of a blurred image with a deblurred images, according to an embodiment.
Figure 7B:
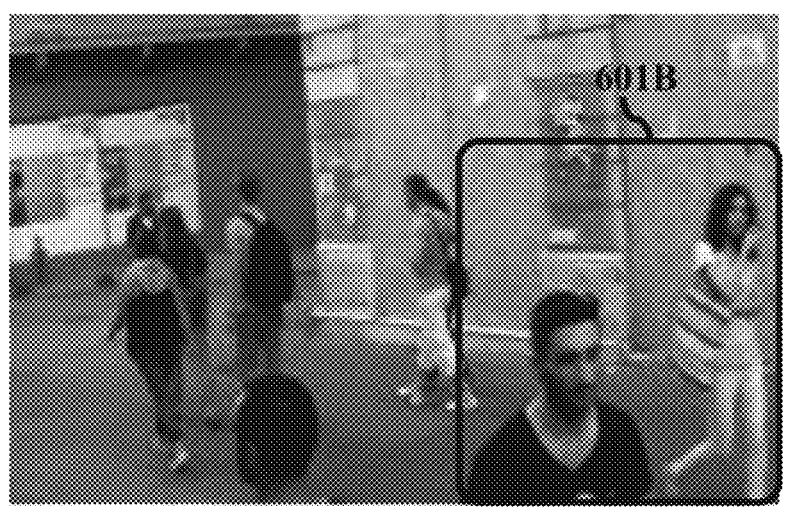
Figure 7C:
Figure 7D:
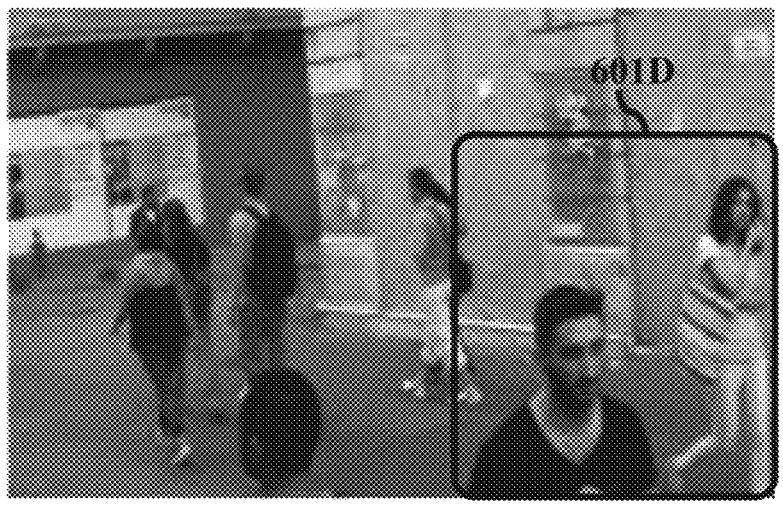
Figure 7E:
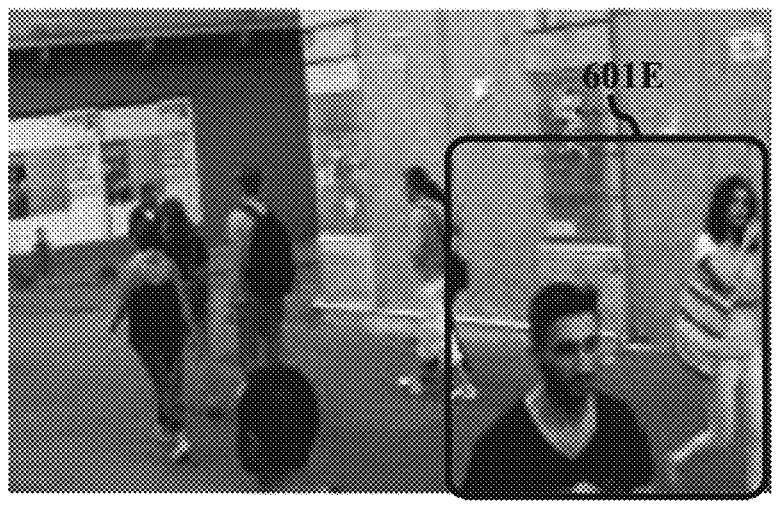

A blurred image of a scene of a street is shown in FIG. 7A, where a blurred potion in the image is marked as 601A. A ground truth image of the scene of the street is shown in FIG. 7B. FIG. 7C illustrates a deblurred image that is generated by the electronic device 100 using the first design of the encoder ResBlock described above with reference to FIG. 5A, where the blur is corrected in a marked potion 601C in the image. FIG. 7D illustrates a deblurred image that is generated by the electronic device 100 using the second design of the encoder ResBlock described above with reference to FIG. 5B, where the blur is corrected in a marked potion 601D in the image. FIG. 7E illustrates a deblurred image that is generated by the electronic device 100 using the third design of the encoder ResBlock described above with reference to FIG. 5C, where the blur is corrected in a marked potion 601E in the image.

Various embodiments may be implemented as software that includes instructions stored in machine-readable storage media readable by a machine (e.g., a computer). A device (e.g., an electronic apparatus) may call instructions from a storage medium and operate in accordance with the called instructions. When the instruction is executed by a processor, the processor may perform the function corresponding to the instruction, either directly or using other components under the control of the processor. The instructions may include a code generated by a compiler or a code executable by an interpreter. The machine-readable storage medium may be provided in the form of a non-transitory storage medium. The "non-transitory" storage medium may not include a signal and is tangible, but does not distinguish whether data is permanently or temporarily stored in a storage medium.

According to embodiments, a method disclosed herein may be provided in a computer program product. A computer program product may be traded between a seller and a purchaser as a commodity. A computer program product may be distributed in the form of a machine-readable storage medium (e.g., a CD-ROM) or distributed online through an application store (e.g., PLAYSTORE™). In the case of on-line distribution, at least a portion of the computer program product may be stored temporarily in a storage medium, such as a manufacturer's server, a server in an application store, a memory in a relay server, and the like, or temporarily generated.

Each of the components (for example, a module or a program) according to embodiments may include one or a plurality of objects, and some components or some subcomponents of the component described above may be omitted, or other components or subcomponents may be further included in the embodiments. Alternatively or additionally, some components (e.g., modules or programs) may be integrated into one entity to perform the same or similar functions performed by each respective component prior to integration. Operations performed by a module, program, or other component, in accordance with the embodiments of the disclosure, may be performed sequentially, in a parallel, repetitive, or heuristic manner, or at least some operations may be performed in a different order, omitted, or other operations may be added.

At least one of the components, elements, modules or units described herein may be embodied as various numbers of hardware, software and/or firmware structures that execute respective functions described above, according to an embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above embodiments may be implemented in algorithms that execute on one or more processors. Furthermore, the components, elements or units represented by a block or processing operations may employ any number of related art techniques for electronics configuration, signal processing and/or control, data processing and the like.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, those skilled in the art will recognize that the embodiments herein may be practiced with modification within the scope of the embodiments as described herein.

What is claimed is:

1. A method for deblurring a blurred image, the method comprising:
    encoding, by at least one processor, a blurred image at a plurality of stages of encoding to obtain an encoded image at each stage of the plurality of stages;
    decoding, by the at least one processor, an encoded image obtained from a final stage of the plurality of stages of encoding by using an encoding feedback from each stage of the plurality of stages and a machine learning (ML) feedback from at least one ML model; and
    generating, by the at least one processor, a deblurred image in which at least one portion of the blurred image is deblurred based on a result of the decoding,
    wherein the encoding comprises:
        generating a first set of feature maps corresponding to a channel number by performing a point-wise convolution on the blurred image;
        generating a second set of feature maps corresponding to the channel number by performing a depth-wise convolution on the blurred image; and
        generating a set of threshold-based blur feature maps using the first set of feature maps and the second set of feature maps, and encoding the blurred image by using the set of threshold- based blur feature maps.

2. The method according to claim 1 wherein the generating the set of threshold-based blur feature maps comprises:
    obtaining a threshold weight of a feature map of the first set of feature maps using the at least one ML model, wherein the threshold weight of the feature map indicates one of an overall blur weightage of the feature map or a minimum blur feature value to be present in the feature map;
    comparing each pixel value of the feature map with the threshold weight corresponding to the feature map; and
    generating a threshold feature map mask corresponding to the feature map based on a result of the comparing.

3. The method according to claim 2, further comprising:
    generating, by the at least one processor, the set of threshold-based blur feature maps by performing an element-wise product between the second set of feature maps and a set of threshold feature map masks corresponding to respective feature maps of the first set of feature maps.

4. The method according to claim 2, wherein the at least one ML model is trained to generate the threshold weight of the feature map by:
    generating a threshold vector comprising threshold weights with random values at each stage of encoding, where each threshold weight in the threshold vector corresponds to each feature map of the first set of feature maps;
    learning updates in values of the threshold weights at each stage of encoding during a training phase of the at least one ML model; and
    updating the values of the threshold weights based on the learning based on completing the training phase.

5. The method according to claim 1, wherein the decoding comprises:
    decoding the encoded image obtained from the final stage of the plurality of stages of encoding by performing deconvolution at each stage of decoding and using encoded images obtained from remaining stages of the plurality of stages of encoding and the ML feedback from the at least one ML model.

6. The method according to claim 1, wherein the at least one ML model is trained by:
    obtaining a weightage of at least one portion in a plurality of blurred images based on a plurality of deblurred images, the plurality of deblurred images corresponding to the plurality of blurred images;
    training each neural network node of the at least one ML model based on the weightage; and
    training the at least one ML model based on the trained neural network node.

7. The method according to claim 1, further comprising storing, by the at least one processor, the deblurred image.

8. The method according to claim 1, wherein the encoding comprises performing a plurality of stages of point-wise convolution on the blurred image to obtain the encoded image.

9. The method according to claim 1, wherein the encoding comprises performing a plurality of stages of depth-wise convolution on the blurred image to obtain the encoded image.

10. A non-transitory storage medium storing computer code executable by at least one processor to perform the method according to claim 1.

11. An electronic device for deblurring a blurred image, the electronic device comprising:
  at least one memory configured to store program code; and
  at least one processor configured to read the program code and operate to:
    encode a blurred image at a plurality of stages of encoding to obtain an encoded image at each stage of the plurality of stages;
    decode an encoded image obtained from a final stage of the plurality of stages of encoding by using an encoding feedback from each stage of the plurality of stages and a machine learning (ML) feedback from at least one ML model; and
    generate a deblurred image in which at least one portion of the blurred image is deblurred based on a result of the decoding,
    wherein the at least one processor is further configured to encode the blurred image by:
      generating a first set of feature maps corresponding to a channel number by performing a point-wise convolution on the blurred image;
      generating a second set of feature maps corresponding to the channel number by performing a depth-wise convolution on the blurred image; and
      generating a set of threshold-based blur feature maps using the first set of feature maps and the second set of feature maps and encoding the blurred image by using the set of threshold-based blur feature maps.

12. The electronic device according to claim 11, wherein the at least one processor is further configured to generate the set of threshold-based blur feature maps by:
  obtaining a threshold weight of a feature map of the first set of feature maps using the at least one ML model, wherein the threshold weight of the feature map indicates one of: an overall blur weightage of the feature map and a minimum blur feature value to be present in the feature map;
  comparing each pixel value of the feature map with the threshold weight corresponding to the feature map; and
  generating a threshold feature map mask corresponding to the feature map based on a result of the comparing.

13. The electronic device according to claim 12, wherein the at least one processor is further configured to:
  generate the set of threshold-based blur feature maps by performing an element-wise product between the second set of feature maps and a set of threshold feature map masks corresponding to respective feature maps of the first set of feature maps.

14. The electronic device according to claim 12, wherein the at least one ML model is trained to generate the threshold weight for the feature map by:
  generating a threshold vector comprising threshold weights with random values at each stage of encoding, where each threshold weight in the threshold vector corresponds to each feature map of the first set of feature maps;
  learning updates in values of the threshold weights at each stage of encoding during a training phase of the at least one ML model; and
  updating the values of the threshold weights based on the learning based on completing the training phase.

15. The electronic device according to claim 11, wherein the at least one processor is further configured to:
  decode the encoded image obtained from the final stage of the plurality of stages of encoding for the plurality of stages by performing deconvolution at each stage of decoding and using the encoded images obtained from remaining stages of the plurality of stages of encoding and the ML feedback from the at least one ML model.

16. The electronic device according to claim 11, wherein the at least one ML model is trained by:
  obtaining a weightage of at least one portion in a plurality of blurred images based on a plurality of deblurred images, the plurality of deblurred images corresponding to the plurality of blurred images;
  train each neural network node of the at least one ML model based on the weightage; and
  train the at least one ML model based on the trained neural network node.

17. The electronic device according to claim 11, wherein the at least one processor is further configured to store the deblurred image.

18. The electronic device according to claim 11, wherein the at least one processor is further configured to encode the blurred image by performing a plurality of stages of point-wise convolution on the blurred image or a plurality of stages of depth-wise convolution.

* * * * *